United States Patent
Dick et al.

(10) Patent No.: US 7,031,789 B1
(45) Date of Patent: Apr. 18, 2006

(54) PROCESS MANAGEMENT SYSTEM AND METHOD

(75) Inventors: Spencer B. Dick, Portland, OR (US);
Wesley Aday, Vancouver, WA (US);
David A. Morgan, Portland, OR (US);
David Lee, Vancouver, WA (US)

(73) Assignee: Precision Automation, Inc., Vancouver, WA (US)

( * ) Notice: Subject to any disclaimer, the term of this patent is extended or adjusted under 35 U.S.C. 154(b) by 0 days.

(21) Appl. No.: 10/645,826

(22) Filed: Aug. 20, 2003

Related U.S. Application Data

(60) Provisional application No. 60/405,068, filed on Aug. 20, 2002, provisional application No. 60/405,067, filed on Aug. 20, 2002, provisional application No. 60/405,069, filed on Aug. 20, 2002.

(51) Int. Cl.
*G06F 19/00* (2006.01)

(52) U.S. Cl. .................. 700/117; 700/98; 101/483; 83/13

(58) Field of Classification Search ............. 700/102, 700/106, 107, 108, 95, 117, 180, 160, 171, 700/173–174, 97, 182; 83/75.5, 71
See application file for complete search history.

(56) References Cited

U.S. PATENT DOCUMENTS

| | | | |
|---|---|---|---|
| 2,577,766 A | 12/1951 | Johnson et al. | |
| 2,852,049 A | 9/1958 | Peterson | |
| 3,170,736 A | 2/1965 | Wright | |
| 3,566,239 A | 2/1971 | Taniguchi | |
| 3,584,284 A | 6/1971 | Beach | |
| 3,814,153 A | 6/1974 | Schmidt | |
| 3,854,889 A | 12/1974 | Lemelson | |
| 4,221,974 A | 9/1980 | Mueller et al. | |
| 4,260,001 A | 4/1981 | De Muynck | |
| 4,358,166 A | 11/1982 | Antoine | |
| 4,453,838 A | 6/1984 | Loizeau | |
| 4,472,783 A | 9/1984 | Johnstone et al. | |
| 4,725,961 A | 2/1988 | Pearl | |
| 4,874,996 A | 10/1989 | Rosenthal | |
| 4,878,524 A | 11/1989 | Rosenthal et al. | |
| 5,001,955 A | 3/1991 | Fujiwara | |
| 5,054,938 A | 10/1991 | Ide | |
| 5,197,172 A | 3/1993 | Takagi et al. | |
| 5,251,142 A * | 10/1993 | Cramer | 700/171 |
| 5,266,878 A | 11/1993 | Makino et al. | |
| 5,365,812 A | 11/1994 | Harnden | |
| 5,418,729 A | 5/1995 | Holmes et al. | |
| 5,444,635 A * | 8/1995 | Blaine et al. | 700/171 |
| 5,460,070 A | 10/1995 | Buskness | |
| 5,472,028 A | 12/1995 | Faulhaber | |
| 5,489,155 A | 2/1996 | Ide | |
| 5,524,514 A | 6/1996 | Hadaway et al. | |
| 5,664,888 A | 9/1997 | Sabin | |
| RE35,663 E | 11/1997 | Mori et al. | |
| 5,772,192 A | 6/1998 | Hoffmann | |
| 5,797,685 A | 8/1998 | Jurik et al. | |
| 5,798,929 A | 8/1998 | Stenzel et al. | |
| 5,829,892 A | 11/1998 | Groves | |
| 5,865,080 A | 2/1999 | Jackson | |
| 5,933,353 A | 8/1999 | Abriam et al. | |

(Continued)

Primary Examiner—Kidest Bahta
(74) Attorney, Agent, or Firm—Kolisch Hartwell, P.C.

(57) ABSTRACT

A system for managing projects enables manipulation and downloading of one or more cut lists to a controller. The controller then interfaces with a saw machine to optimize processing of material in a manufacturing operation.

8 Claims, 1 Drawing Sheet

Figure 1:
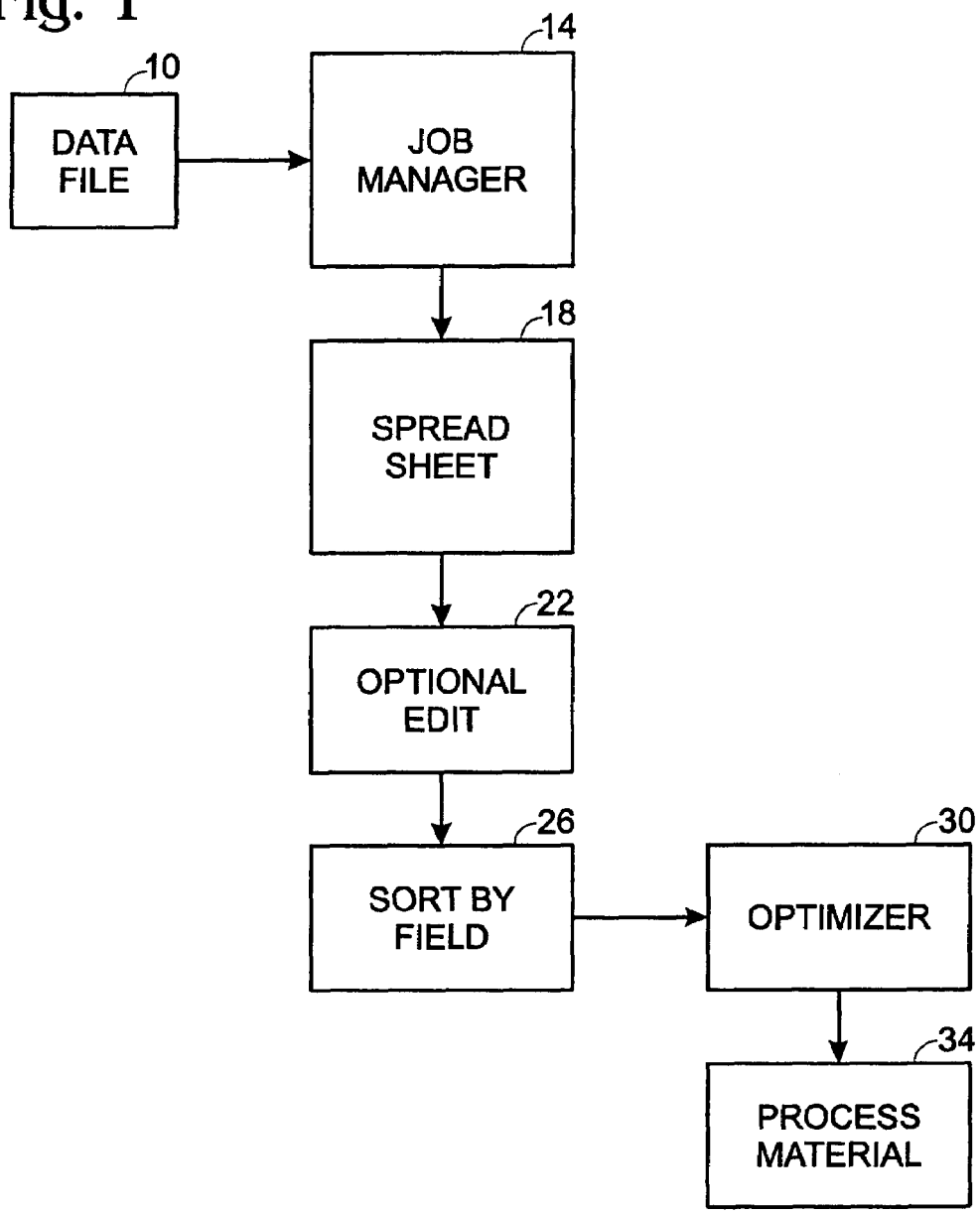

U.S. PATENT DOCUMENTS 5,938,344 A    8/1999   Sabin
5,953,232 A    9/1999   Blaimschein
6,631,006 B1    10/2003   Dick et al.
6,690,990 B1 *    2/2004   Caron et al. ................ 700/171

* cited by examiner

PROCESS MANAGEMENT SYSTEM AND METHOD

CROSS-REFERENCE TO RELATED APPLICATIONS

This application claims priority under 35 U.S.C. § 119 and applicable foreign and international law of U.S. Provisional Patent Application Ser. No. 60/405,068 filed Aug. 20, 2002, Ser. No. 60/405,067 filed Aug. 20, 2002 and Ser. No. 60/405,069 filed Aug. 20, 2002 which are all hereby incorporated by reference.

This application incorporates by reference in its entirety the following U.S. patent applications and patents: U.S. patent application Ser. No. 09/578,806 filed May 24, 2000 entitled "Automated Fence Control Coupling System"; U.S. patent application Ser. No. 09/861,231 filed May 17, 2001 entitled "System and Method of Marking Materials for Automated Processing"; U.S. patent application Ser. No. 10/104,492 filed Mar. 22, 2002 entitled "Automated Fence Control Coupling System"; U.S. patent application Ser. No. 10/642,349 filed Aug. 15, 2003 entitled "Linkage Device for Linear Positioning Apparatus"; U.S. patent application Ser. No. 10/645,827 filed Aug. 20, 2003 entitled "Systems and Methods for Automated Material Processing" and U.S. Pat. Nos. 491,307; 2,315,458; 2,731,989; 2,740,437; 2,852,049; 3,994,484; 4,111,088; 4,434,693; 4,658,687; 4,791,757; 4,805,505; 4,901,992; 5,251,142; 5,443,554; 5,444,635; 5,460,070; 5,524,514; and 6,216,574.

FIELD OF THE INVENTION

The invention relates to product manufacturing. In particular, the invention involves management of manufacturing projects, for example, including manipulation and downloading of a cut list to a controller.

BACKGROUND OF THE INVENTION

Production facilities typically need to process materials in batches. For example, it may be necessary to cut wood in varying dimensions to build a cabinet system or a furniture item. The list of wood dimensions required to build the product may be referred to as a "cut list". Optimization programs are used in the industry to determine a cutting routine to satisfy the cut list based on raw material dimensions, defects, etc. However, sometimes it may be desirable or more efficient to cut subsets of one or more cut lists prior to completing a cut list for a particular product. For example, it may be desirable to cut frame parts for more than one cabinet system at the same time prior to completing a cut list for a single cabinet system. Accordingly, there is a need for a file manager program that enables a user to edit, reconfigure, create sub-lists, etc., prior to downloading a cut list to a controller, for improved processing efficiency.

DESCRIPTION OF EXAMPLES OF THE INVENTION

FIG. 1 shows a flow chart with steps in a preferred process for carrying out the invention. First, a data file 10 is loaded into job manager 14 in a computer. Data file 10 may, for example, include a cut list of material dimensions required for a particular product or project. Job manager 14 displays the data in a spreadsheet 18. The user is then free to edit 22 data in the spreadsheet for any reason. For example, it may be desirable to modify the cut list for a customized product configuration. Alternatively, it may be desirable to multiply selected fields in the spreadsheet by a factor for manufacturing pieces for multiple products.

Spreadsheet 18 is organized in multiple fields. Fields may be arranged by column, row or any other systematic arrangement. The user may then sort 26 data in the spreadsheet, for example, by field. The sorted data is then transferred to the optimization program 30 which carries out material processing 34.

EXAMPLES

A cabinet maker is building a number of kitchen cabinet modules. Within each cabinet module there are a number of frame parts all made of the same stock. The cabinet maker has a cut list for an entire cabinet module. The cabinet maker wants to cut frame parts for a number of cabinet modules prior to completing a cut list for any single cabinet module. Accordingly, the cabinet maker takes the cut list for a cabinet module and imports it into the job manager. The data is displayed on a spreadsheet. The cabinet maker may sort the data by field, to select the part of the cut list including frame parts that will be made from the same stock. The selected data is then downloaded to the optimizer and the stock is cut. If the operator wants to cut frame parts for multiple modules, he can multiply, or otherwise edit, the part numbers in a given field prior to downloading the data to the optimizer.

An example of a preferred embodiment of the invention is attached as an appendix.

The specific embodiments disclosed and illustrated herein should not be considered as limiting the scope of the invention. Numerous variations are possible without falling outside the scope of the appended claims. For example, the invention may be implemented in numerous different machine configurations with varying levels of automation. The invention may also be used to process many different kinds of materials including, but not limited to, wood, wood composites, polymeric materials such as PVC, polystyrene, polypropylene, polyethylene, fiberglass, textiles, etc. In addition to cutting, the invention may be used to carry out other processing steps such as bonding, sewing, heating, UV curing, painting or graphics application, etc. The subject matter of the invention includes all novel and nonobvious combinations and subcombinations of the various elements, features, functions, and/or properties disclosed herein.

The invention claimed is:

1. A method of processing material comprising
   providing a material list for a product,
   loading the material list into a job manager,
   moving the material list into a spreadsheet,
   selecting a field in the spreadsheet,
   downloading the selected field of data to an optimizer,
   selecting a piece of wood material for processing,
   inputting data to the optimizer indicating location of defects in the wood material, and
   determining a processing plan for the wood material including excluding the defects and optimizing use of the remaining material according to the selected field of data.

2. The method of claim 1 further comprising
   editing data in the selected field prior to the downloading step.

3. The method of claim 1 further comprising the step of operating a saw to cut stock material according to data received by the optimizer.

4. The method of claim 1 wherein the material list includes a cut list of wood dimensions for a product.

5. The method of claim 1 further comprising
sorting data in the spreadsheet by field prior to the downloading step.

6. The method of claim 1 further comprising
performing a mathematical function on selected data in the spreadsheet prior to the downloading step.

7. An apparatus for carrying out material processing comprising
- a computer including a job manager program configured to receive a data file including a cut list of wood pieces for a product, to display the cut list in a spreadsheet, and to permit editing, and sorting data by field,
- a saw system for cutting wood including a defect locator configured to input data to the saw system indicating location of defects in a wood piece prior to cutting, and
- an optimizer capable of determining an optimal way of cutting a piece of wood by excluding defects and utilizing remaining wood to satisfy cut list requirements, and
- a downloading mechanism enabling transfer of selected data from the job manager to the optimizer.

8. A method of processing material comprising
providing a material list for a product,
loading the material list into a job manager,
moving the material list into a spreadsheet,
selecting a field in the spreadsheet,
multiplying data in the field by a factor,
downloading the selected field of data to an optimizer,
downloading the multiplied data from the field to an optimizer,
selecting a piece of wood material for processing,
inputting data to the optimizer indicating location of defects in the wood material, and
determining a processing plan for the wood material including excluding the defects and optimizing use of the remaining material according to the selected field of data.

* * * * *